J. P. PRAIRIE.
Combined Cotton Planter and Guano Distributer.
No. 232,204. Patented Sept. 14, 1880.
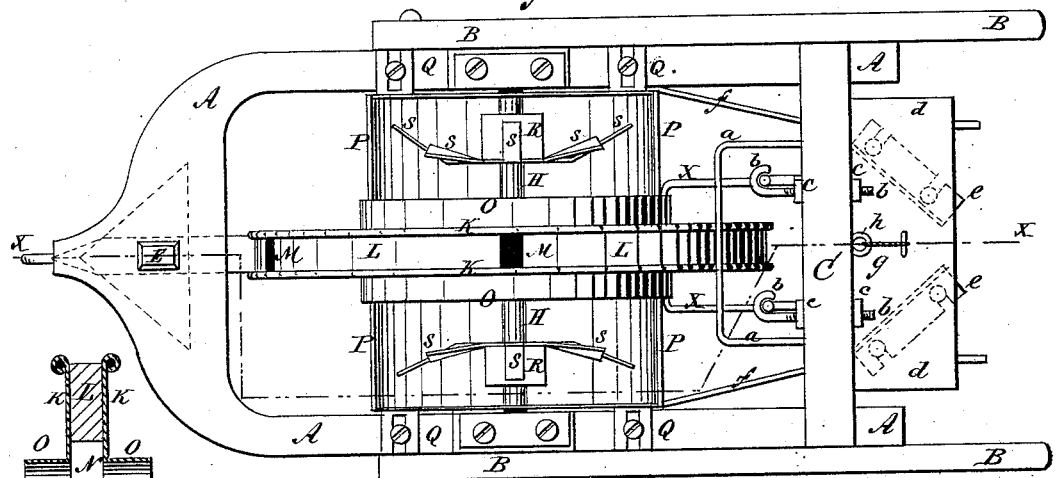
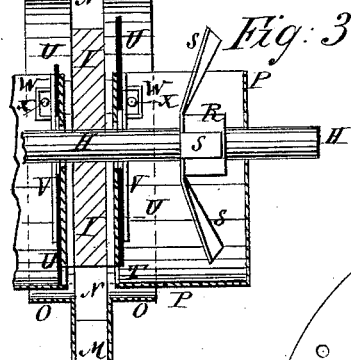
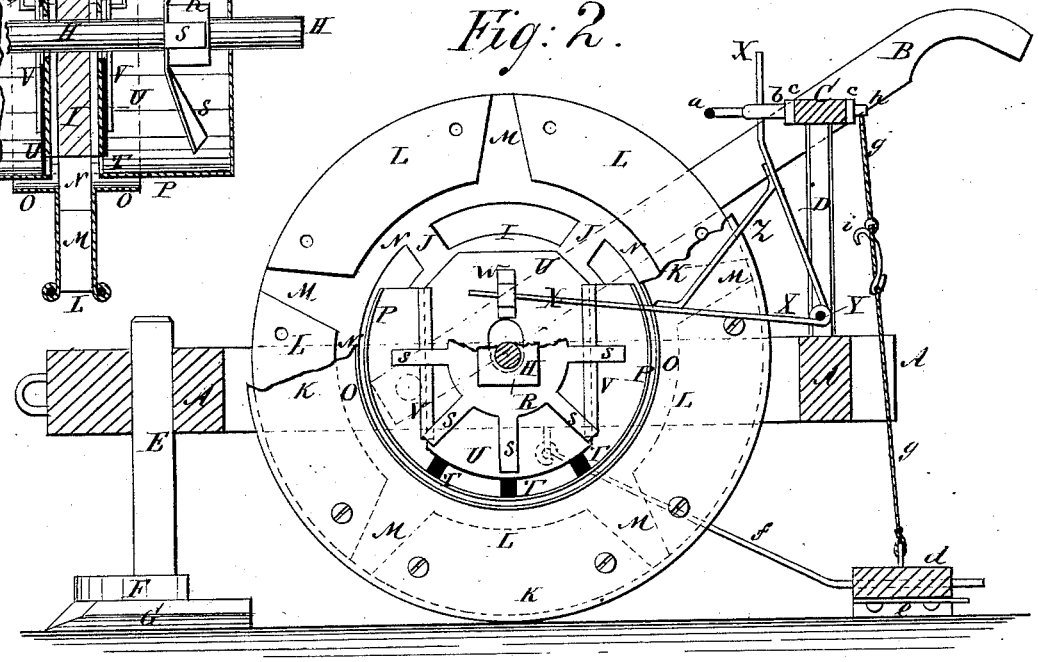
WITNESSES:
A. Schehl.
C. Sedgwick
INVENTOR:
J. P. Prairie
BY Munn & Co
ATTORNEYS.

UNITED STATES PATENT OFFICE.

JOSEPH P. PRAIRIE, OF RALEIGH, NORTH CAROLINA.

COMBINED COTTON-PLANTER AND GUANO-DISTRIBUTER.

SPECIFICATION forming part of Letters Patent No. 232,204, dated September 14, 1880.

Application filed January 28, 1880.

*To all whom it may concern:*

Be it known that I, JOSEPH P. PRAIRIE, of Raleigh, in the county of Wake and State of North Carolina, have invented a new Improvement in Combined Cotton-Planters and Guano-Distributers, of which the following is a specification.

Figure 1 is a plan view of the improvement. Fig. 2 is a sectional side elevation taken through the broken line *x x*, Fig. 1. Fig. 3 is a sectional end elevation of a part of the improvement.

Similar letters of reference indicate corresponding parts.

The object of this invention is to furnish combined cotton-planters and guano-distributers so constructed as to drop cotton-seed and guano at the same time in uniform quantities and cover the seed and guano, and which can be adjusted to drop a larger or smaller quantity of either or both as required.

A represents the frame of the machine, to the middle parts of the side bars of which are attached the lower ends of the handles B. The handles B are kept at the proper distance apart by the cross-bar C, to the ends of which they are attached, and are supported at the proper height by the standards D. The upper ends of the standards D are attached to the cross-bar C, and their lower ends are attached to the rear cross-bar of the frame A.

To the center of the forward end of the frame A is attached a standard, E, to the lower end of which is attached a triangular block, F, having a triangular bar, G, made with a pointed forward end, attached to its lower side. With this construction the bar G opens a furrow or channel to receive the seed and guano, and the inclined sides of the block F push back stones, lumps, clods, and loose soil, to prevent the furrow from becoming partially filled before the seed and guano have been deposited in it.

In bearings in the middle part of the side bars of the frame A revolve the journals of the axle H, to the center of which is attached a wheel or disk, I. With the outer part of the disk I are connected, by arms J, two parallel ring-plates, K, sufficient space being left between the outer edge of the disk I and the inner edges of the ring-plates K for the passage of the cotton-seed and guano.

Between the ring-plates K are secured blocks L, made in the form of sections of rings and having tapering spaces M between their adjacent ends, through which the seed and guano pass to the ground. The blocks L are made of a length equal to the required distance apart of the hills. The blocks L do not extend so far inward as the ring-plates K, so as to form a channel, N, between the inner edges of the ring-plates K, to receive the seed and guano and guide them to the discharge-spaces M. The outer edges of the ring-plates are beaded or thickened to receive the wear, and project a little beyond the outer edges of the blocks L, to protect the said blocks from wear.

When the seed and guano are to be planted in drills, the blocks L are detached, and the seed and guano are allowed to escape between all parts of the ring-plates K. Around the inner edges of the ring-plates K are formed outwardly-projecting ring-flanges O, which overlap the sides and bottom of the two hoppers P. The hoppers P are placed upon the opposite sides of the dropping-wheel, and have holes in their inner and outer sides, through which the axle H passes, so that the hoppers P may ride upon and be supported by the said axle H.

Upon the outer sides of the hoppers P are formed, or to them are attached, lugs Q, which are slotted to receive the screws or bolts that secure them to the side bars of the frame A, so that the hoppers P may be adjusted closer to or farther from the wheel I, as may be desired, to prevent friction.

To the axle H, within each hopper P, is secured a hub, R, to which are attached arms S, to keep the seed and guano stirred up, and to move them toward and force them through the discharge-openings. The arms S may be slightly bent or twisted to make them more effective.

In the lower parts of the inner sides of the hoppers P are formed discharge-openings T, the size of which is regulated by the slides U. The slides U are placed against the inner sides of the hoppers P, are slotted to receive the axle H, and move up and down in guide-cleats V, attached to the said hoppers P. The lower edges of the slides U are rounded off to correspond with the curvature of the hopper-bottoms, and to the upper parts of the said slides are attached keepers W, in which work the ends of the forward arms of the bent levers X. The levers X pass through slots in the rear sides of the hoppers P, and are pivoted at their angles to a rod, Y, the ends of which are attached to the standards D. The angular levers X are strengthened by braces Z, the ends of which are attached to the arms of the said levers at a little distance from their angles, as shown in Fig. 2. The upper arms of the levers X pass up through a long guide-loop, a, attached to the cross-bar C, to keep the upper arms of the levers X from getting out of place.

With this construction the slides U are raised to uncover the discharge-openings T by operating the levers X. The levers X are secured in place while holding the slides U raised by catching the upper arms of the said levers X upon the hooks of hook-bolts b. The hook-bolts b pass through the cross-bar C, and have nuts c screwed upon them upon both sides of the said cross-bar C, so that by adjusting the nuts c the slides U may be held higher or lower, to make the discharge-openings T larger or smaller, according as more or less seed and guano are to be dropped.

d is the covering-block, to the lower side of which are attached, in inclined positions, two angle-plates e, the upper parts of which are slotted to receive the fastening-bolts, so that the positions of the plates e can be readily adjusted to regulate the covering of the seed and guano, as may be required. The draft-strain upon the covering-block d is sustained by the draw-rods f, the rear ends of which are attached to the said covering-block d, and their forward ends are hinged to the lower sides of the middle parts of the side bars of the frame A.

To the center of the upper side of the covering-block d is attached the lower end of a cord, g, the upper end of which is attached to an eyebolt, h, screwed into the rear side of the cross-bar C. To the cord g, at a suitable distance from its upper end, is attached a hook, i, which may be hooked into the eye of the bolt h when the coverer is to be supported away from the ground. The cord g is made of such a length that it will not interfere with the play of the coverer d in adjusting itself to the surface of uneven ground.

Having thus described my invention, what I claim as new, and desire to secure by Letters Patent, is—

1. In a cotton-planter and guano-distributer, the dropping-wheel constructed, as herein shown and described, of the disk I, the arms J, the ring-plates K, and the blocks L, whereby the seed and guano are received from the hoppers and dropped to the ground, as set forth.

2. In a cotton-planter and guano-distributer, the combination, with the dropping-wheel formed of the disk I, arms J, flanged ring-plates O K, and blocks L, of the hoppers P and the adjustable slides U, substantially as herein shown and described, whereby the seed and guano are delivered to the dropping-wheel, as set forth.

JOSEPH PIEDALUE PRAIRIE.

Witnesses:
W. W. WHITE,
L. N. WHITE.